United States Patent [19]

Stichling et al.

[11] 4,283,987
[45] Aug. 18, 1981

[54] EXPLOSIVE RELEASE CLAMP SYSTEM

[75] Inventors: Gerhardt C. Stichling, West Caldwell; James McPherson, Succasunna, both of N.J.

[73] Assignee: Cartridge Actuated Devices, Inc., Fairfield, N.J.

[21] Appl. No.: 51,470

[22] Filed: Jun. 25, 1979

[51] Int. Cl.³ .............................................. F42B 3/00
[52] U.S. Cl. ...................................................... 89/1 B
[58] Field of Search ................. 89/1 B, 1 R, 1.5 F, 89/1.806; 294/83 AE; 60/632, 635, 636, 637, 638

[56] References Cited

U.S. PATENT DOCUMENTS

| | | | |
|---|---|---|---|
| 2,436,364 | 2/1948 | McDowell | 89/1 B X |
| 3,012,810 | 12/1961 | Tenney | 89/1 B X |
| 3,119,302 | 1/1964 | Barr | 89/1 B |
| 3,130,703 | 4/1964 | Thompson | 294/83 AE X |
| 3,224,628 | 12/1965 | Emigh et al. | 89/1 B X |
| 3,352,189 | 11/1967 | Brown | 89/1 B X |
| 3,362,290 | 1/1968 | Carr et al. | 89/1 B |
| 3,373,656 | 3/1968 | Kriesel | 89/1 B |
| 3,408,890 | 11/1968 | Bochman | 89/1 B X |

*Primary Examiner*—David H. Brown
*Attorney, Agent, or Firm*—Nolte and Nolte

[57] ABSTRACT

An explosive release clamp adapted to be opened suddenly by electrical initiation of an explosive charge, and a safety pressure release system for closed vessels such as chemical reactors, high pressure storage tanks, or the like, wherein one or more such clamps are used to secure a main hatch to a reactor vessel. Upon occurrence of an emergency condition such as over-pressure, all clamps are automatically fired simultaneously to release the hatch. A manual override circuit enables firing the clamps in case the hatch must be released without an emergency signal. A test circuit checks the clamps and their associated cabling for electrical continuity, using a current substantially less than that required to fire the clamps.

7 Claims, 3 Drawing Figures

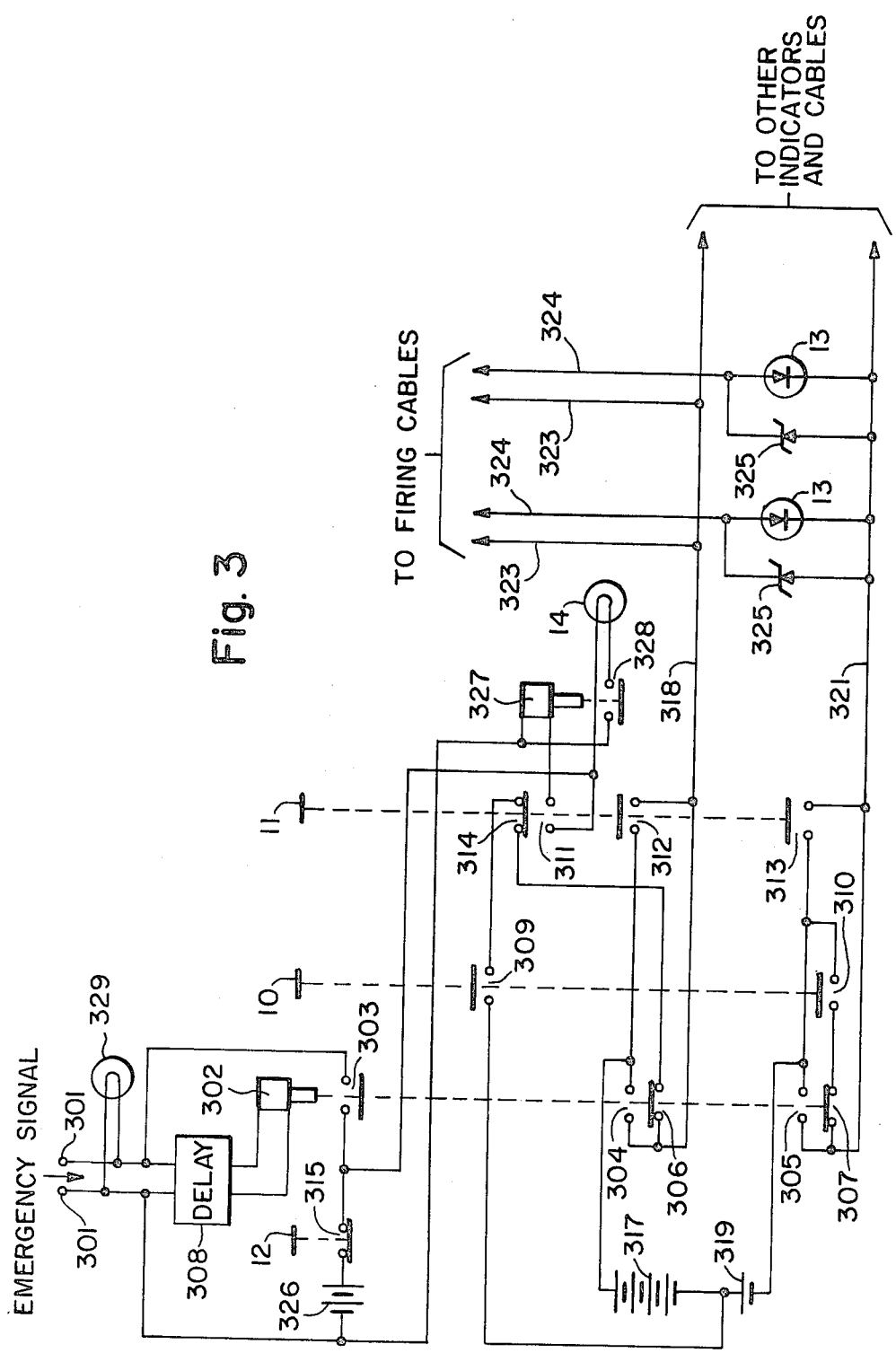

EXPLOSIVE RELEASE CLAMP SYSTEM

BACKGROUND OF THE INVENTION

In some chemical process operations closed reactor vessels are used to contain reagents that are to react under substantial pressure. The interior of the vessel is accessible through a relatively large opening which is closed by a main hatch during operation. Sensors inside the vessel are usually arranged to provide indications at some exterior location of operating conditions such as temperature and pressure. Generally, some provision is made for giving an alarm or emergency signal when the internal pressure, for example, becomes excessive.

The sensor outputs and/or emergency signal may be monitored by a human operator, or in some instances by a computer, to take appropriate measures such as turning off a heater when the reactor pressure begins to build up. However, in some cases the pressure can increase much too suddenly to be counteracted in such manner, or by conventional safety valve systems. In such event, the reactor may explode, destroying itself and damaging its environment.

SUMMARY

According to this invention, the main hatch is secured to the reactor vessel by a number of explosive release clamps arranged to be fired simultaneously and substantially instantaneously by application of at least a predetermined electrical voltage. When so released, the hatch is free to be pushed up by the internal pressure, opening a relatively large area of the vessel and allowing the pressure to decrease instantly.

The clamps are so designed that there is no fragmentation, and no release of explosion products. A potentially dangerous increase in the reactor pressure or temperature produces an emergency signal which actuates switches for applying a firing voltage to all of the clamps by way of cables from a control station.

BRIEF DESCRIPTION OF THE DRAWINGS

FIG. 3 is a circuit diagram of the clamp testing and firing system.

DESCRIPTION OF PREFERRED EMBODIMENTS

Figure 1:
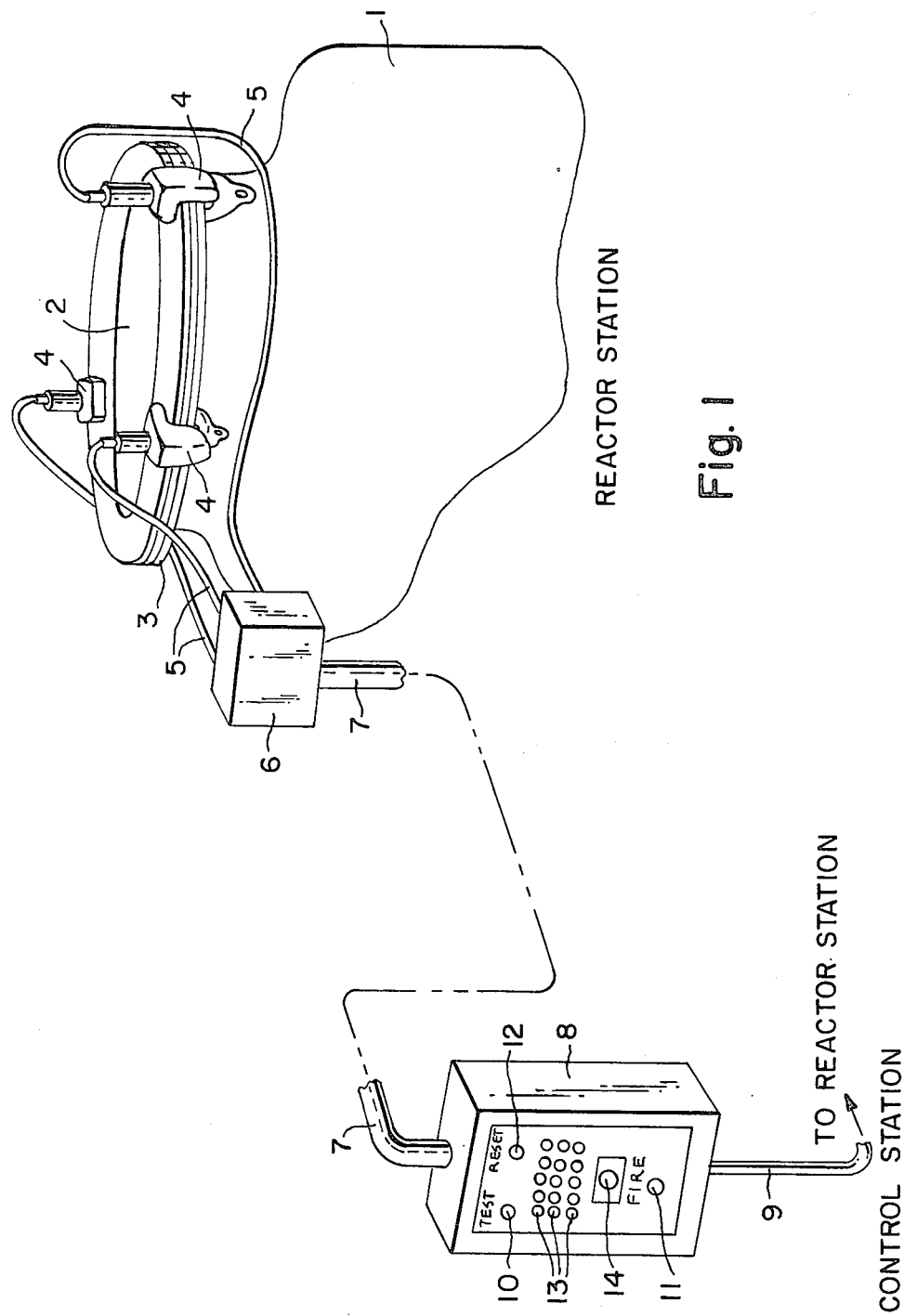
FIG. 1 is a pictorial diagram illustrating generally the physical arrangement of a reactor vessel with hatch in place, safety clamp and actuator cable means, and clamp firing and continuity checking means at a control station.

Referring to FIG. 1, the upper portion of a typical reactor vessel 1 is shown in the form of a wide-mouthed bottle made of steel, for example. After the intended reagents have been placed in the vessel, the mouth is covered by a main hatch 2 which is secured to a lip 3 of the vessel by a plurality of clamps 4. The clamps 4 are connected by respective cables 5 to a junction box 6 suitably designed to be proof against liquids or gases that could escape from the reactor. Preferably the reactor and all of the above described elements are disposed in a reinforced enclosure or block house, not shown.

The cables 5 are connected through junction box 6 to respective wires contained in a conduit 7 extending from the reactor station to a control panel 8 at a physically isolated control station. Also connected to control panel 8, as by way of a conduit 9, is a circuit adapted to carry an emergency signal produced at the reactor station by conventional equipment, forming no part of this invention, in response to an over-pressure, over-temperature or "run-away" condition in the reactor. The face of the control panel carries manually operable switch actuators 10, 11 and 12 denoted "Test", "Fire", and "Reset", respectively, a plurality of indicator lights 13, and an additional indicator 14 associated with the "Fire" actuator 11.

Figure 2:
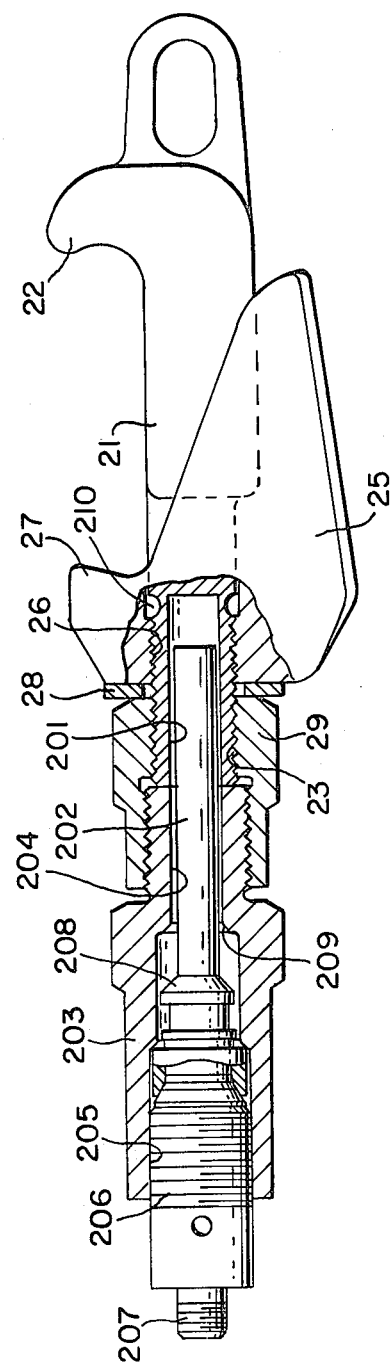
FIG. 2 is an elevational view, partly in cross-section, of an explosive release clamp used in the system of FIG. 1.

Referring to FIG. 2, the explosive release clamp 4 of FIG. 1 includes a hook bolt 21 provided with a hook portion 22 near one end and an outwardly threaded cylindrical tail 23 at the other, and a body member 25 provided with a cylindrical bore 26 adapted to receive the tail 23 of the hook bolt. The body member 25 is provided with an anvil portion 27 that faces the hook portion 22 when the parts are in assembled relationship as shown. The hook bolt tail 23 extends through a washer 28, and is threaded for engagement with internal threads in the right hand region of a nut 29. The tail 23 bas an axial bore 201 for accommodating the piston rod 202 of an explosively driven motor device 203. Near the inner end of bore 201, the tail 23 is circumferentially grooved as at 204 to provide a region of reduced tensile strength. The lefthand region of nut 29 is internally threaded to receive the cooperatively threaded end of motor device 203.

The motor device 203 is provided with a bore 204 at its right-hand end for passage of the piston rod 202, and a larger bore 205 at its left-hand end, internally threaded to receive the externally threaded body of an explosive cartridge 206. The cartridge contains pyrotechnic material such as smokeless propellant, and suitable electrically actuable firing means adapted to cause initiation of the explosive upon application of at least a predetermined voltage, such as 36 volts. External connection to the firing device may be made through a cable connector 207 at the left-hand end of the cartridge.

The clamp is installed, preferably without the motor 203, by engaging the hook 22 with the lower surface of the reactor vessel lip 3 (FIG. 1) and the anvil 27 with the upper surface at the edge of the hatch immediately above. For this purpose, the nut 29 may be removed or backed off and then tightened after the clamp is in place. For safety, it is preferable not to insert the cartridge until prepared to initate the reaction.

In emergency release of the clamp, the required voltage is applied to connector 207 through the associated cable, firing the charge in the cartridge 206. The explosion abruptly drives the piston rod 202 to the right, causing it to impact against the righthand end or bottom of the bore 201 with sufficient force to break the tail 23 in the weakened region provided by the groove 204, thereby releasing the hook 22. A truncated conical enlargement 208 on the piston rod wedges into a conforming surface 209 to stop the pin 202 from flying out the broken end of the bolt, and to prevent the escape of products of the explosion.

Referring to FIG. 3, input terminals 301 are adapted to receive an emergency signal which may be, for example, 12 volts dc, from the reactor site. The signal is applied to the actuating coil 302 of a relay device having normally open contact sets 303, 304 and 305, and normally closed contact sets 306 and 307. A conventional delay device 308 may be included to prevent relay operation unless the emergency signal persists for some predetermined length of time.

A test switch having normally open contact sets 309 and 310 is arranged to be actuated by manually operable means 10, such as a push button. A manual firing switch provided with normally open contact sets 311, 312 and 313 and normally closed contact set 314 is similarly arranged to be actuated by manually operable means 11. A reset switch with a normally closed contact set 315 may be manually actuated by means 12.

A battery 317, of sufficient voltage and capacity to assure simultaneous firing of all of the explosive release clamps intended to be used, has one terminal connected by way of normally open contact set 304 to a line 318. A parallel connection is also made by normally open contact set 312, in shunt with set 304. A second battery 319 of sufficiently low enough voltage to assure that it alone cannot fire any of the explosive release clamps, is connected in series with battery 317.

The point of interconnection between the two batteries is connected by way of normally open contact set 309, normally closed set 314 and normally closed set 306 to line 318. The lower terminal of battery 319 is connected to a line 321 by three parallel paths: by way of normally open contact set 305, by way of normally set 310 and normally closed set 307, and by way of normally open set 313.

Pairs of lines 323 and 324 go through conduit 7 in FIG. 1 to the junction box 6, for connection to respective firing cables 5. All lines 323 are directly connected to line 318. Each line 324 is connected through a respective indicator light 13 to line 321. Preferably, lights 13 are light emitting diodes, as schematically shown, poled with their direction of easy conduction downward toward line 321. Light emitting diodes draw relatively small current and operate at low voltage such as that of battery 319. Each light 13 is shunted by a diode 325, poled to conduct upward as shown. More than one diode may be shunted across each light if necessary to carry the current required to fire an explosive release clamp.

A battery 326, of approximately the same voltage as the emergency signal, is connected to relay actuator 302 by way of normally closed contact set 315, normally open set 303 and delay 308. Battery 326 is also connected by way of normally closed set 315 and normally open set 311 to the actuator coil 327 of a relay having a normally open contact set 382. Battery 326 is also connected by way of normally open sets 315 and 328 to indicator lamp 14. A similar indicator lamp 329 may be connected between emergency signal input terminals 301.

After the clamps, cartridges and cables have been installed, the electrical continuity of all firing circuits may be tested by actuating means 10 to close contact sets 309 and 310. This operation connects the positive terminal of low voltage battery 319 through contact sets 309, 314 and 306 to line 318, and connects the negative terminal of battery 319 through sets 310 and 307 to line 321. Current then flows from battery 319 through each line 323, its associated cable and firing circuits, the return line 324, and the respective light emitting diode 13. In case a firing circuit is open, the diode 13 will remain dark, indicating which circuit is faulty.

When an emergency signal is applied to terminals 301, relay actuator 302 is energized, closing contact sets 303, 304 and 305, and opening sets 306 and 307. Battery 326 maintains actuating coil 302 and indicator lamp 329 energized even after cessation of the emergency signal. Batteries 317 and 319 are connected in series with each other across lines 318 and 321 through contact sets 304 and 305. Diodes 325 break down, allowing reverse flow of heavy current through them and lines 323 and 324 and their firing circuits, releasing all explosive clamps simultaneously. Indicator lamp 329 remains on until reset means 12 is actuated, deenergizing relay coil 302 and opening contact set 303.

In some cases, an observer or operator may desire to fire the clamps in the absence of an emergency signal at terminals 301. In such event, means 11 is manually actuated to close contact sets 311, 312 and 313. Batteries 317 and 319 are connected to lines 318 and 321, energizing the firing circuits. Indicator lamp 329 does not light. Relay coil 327 is energized from battery 326 by way of contact sets 315 and 311, closing contact set 328. Indicator lamp is energized from battery 326 through contact sets 315 and 328, and remain on until reset means 12 is manually actuated. Although a specific embodiment has been described in connection with a chemical reactor and a plurality of hatch clamps, the system of the invention may be used with the other closed vessels and, in some cases, with a single clamp.

What is claimed is:

1. A quick-acting pressure relief system for a vessel that is closed during normal operation by a main hatch of relatively large area, comprising:
    (a) one or more clamp means having a normally closed position securing the hatch to the vessel, thrustor means for substantially instantaneously releasing said clamp means from the normally closed position for releasing pressure from the vessel, said thrustor means being electrically actuatable upon brief application of a predetermined voltage.
    (b) respective cables for making separate electrical connections to said clamps from a control station physically isolated from the vessel,
    (c) means for providing an emergency signal at said control station in response to a condition in the vessel that could, if allowed to persist, result in damage as by explosion or overheating,
    (d) an electrical source of at least said predetermined voltage, and switch means arranged to connect said source simultaneously to all said cables in response to occurrence of said emergency signal.

2. The apparatus claimed in claim 1, wherein said switch means includes a time delay device to prevent operation thereof unless said emergency signal persists for a predetermined interval of time.

3. The apparatus claimed in claim 1, further including manually operable override switch means for simultaneously connecting said cables to said source independently of the presence of an emergency signal.

4. The invention claimed in claim 1, wherein each of said thrustor means comprises a self-contained pyrotechnically driven thrustor device adapted to be detonated electrically to open the clamp.

5. The apparatus claimed in claim 1, further including an electrical source of substantially lower voltage than said predetermined voltage, electrically operable indicator means at said control station, and means for connecting said source through said indicator means to each of said cables individually to check the electrically continuity of said cables and clamps.

6. The apparatus claimed in claim 5, wherein said indicator means includes a plurality of light emitting diodes (LED), one for each cable, and each LED is shunted by diode means capable of carrying enough current to actuate a clamp and poled oppositely to the respective LED.

7. An explosive release clamp comprising:
(a) a hook bolt provided with a hook at one end and a cylindrical tail at the other, said tail having a threaded position near its free extremity and an undercut portion providing a region of weakened tensile strength adjacent the end of the threaded position nearer the hook, said tail having an axial bore extending from said free end to a point within said undercut portion, said bore being adapted to receive the impact delivery rod of an explosive actuator device,
(b) a body member having a bore for receiving said tail and an anvil portion facing said hook in clamping relationship, and
(c) a nut threaded at one end to cooperate with the threaded region of said tail for drawing said hook toward said anvil and threaded at the other end to engage a cooperatively threaded end on the body of an explosive actuator device.

* * * * *